United States Patent

[11] 3,569,685

[72] Inventor Gilman D. Chesley
Los Altos, Calif.
[21] Appl. No. 744,184
[22] Filed July 11, 1968
[45] Patented Mar. 9, 1971
[73] Assignee Fairchild Camera and Instrument Corporation
Syosset, Long Island, N.Y.

[54] PRECISION CONTROLLED ARITHMETIC PROCESSING SYSTEM
16 Claims, 6 Drawing Figs.

[52] U.S. Cl. .......... 235/156, 235/159, 235/164
[51] Int. Cl. .......... G06f 7/48
[50] Field of Search .......... 235/156, 159, 160, 164, 168; 340/172.5

[56] References Cited
UNITED STATES PATENTS

| | | | |
|---|---|---|---|
| 3,161,764 | 12/1964 | Croy .......... | 235/160 |
| 3,219,982 | 11/1965 | Tucker .......... | 340/172.5 |
| 3,389,379 | 6/1968 | Erickson et al. .......... | 235/168X |

*Primary Examiner*—Malcolm A. Morrison
*Assistant Examiner*—David H. Malzahn
*Attorneys*—Roger S. Borovoy and Alan H. MacPherson

ABSTRACT: A precision-controlled arithmetic processing system uses a variable field length technique to perform arithmetic operations on multidigit numbers of predetermined precision, and generates a resultant output whose precision is determined by the precision of each of the input numbers and the type of arithmetic operation being performed. Only those digits within the output degree of precision are retained. Digits outside this degree of precision are discarded, thereby eliminating the problem of accumulated digits in variable field length processing.

FIG. 1
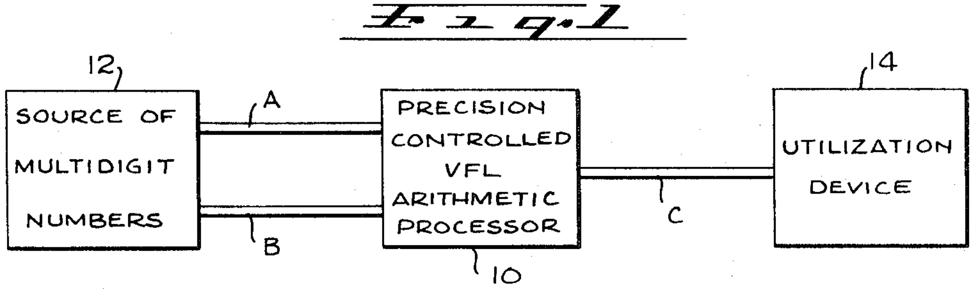
FIG. 2
| LINE | OPERAND A | | OPERAND B | | RESULT C |
|---|---|---|---|---|---|
| a | 12.3 Ex | + | 45.67Ex | = | 57.97 Ex |
| b | 12.37Ex | + | 45.6 EM | = | 57.9 EM |
| c | 12.3 EM | + | 45 Ex | = | 57.3 EM |
| d | 45.63Ex | − | 12.5 EM | = | 33.1 EM |
| e | 1.3 Ex | × | 3 EM | = | 3 EM |
| f | 1.0 EM | ÷ | 3.05Ex | = | .32 EM |
| g | 1 Ex | ÷ | 8 Ex | = | .125Ex |
| h | 12.5 Ex | × | 12.5 Ex | = | 156.25Ex |
FIG. 9
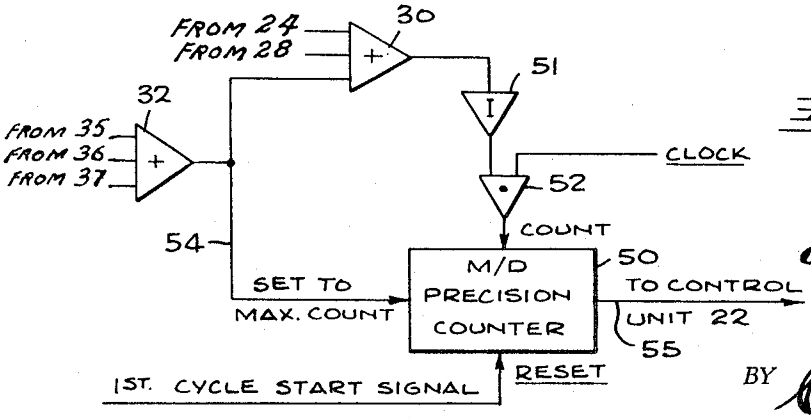
GILMAN D. CHESLEY
INVENTOR.
BY [signature]
ATTORNEY INVENTOR.
GILMAN D. CHESLEY
BY [signature]
ATTORNEY INVENTOR.
GILMAN D. CHESLEY
BY [signature]
ATTORNEY INVENTOR.
GILMAN D. CHESLEY
BY Roger J. Brown
ATTORNEY

PRECISION CONTROLLED ARITHMETIC PROCESSING SYSTEM

BACKGROUND OF THE INVENTION

1. Field of the Invention

This invention relates to an arithmetic processing system using logic circuits and, more particularly, to an improved variable field length arithmetic processor.

2. Description of the Prior Art

In the field of arithmetic processing, two approaches are commonly used. The first is fixed field length processing, in which each word or number being processed is represented by a fixed number of digits regardless of the length or value of the word or number. The other type is variable field length processing, in which only the actual number of digits needed to represent a number or a word being processed is used.

To illustrate the difference, a fixed field processing system may operate with 10 digits per number. All 10 digits must be handled each time a number is processed by the system, even though the number can be represented by less than 10 digits. On the other hand, using the variable field length approach, if a number is represented by, for example, three digits, only those three digits need to be handled during the processing rather than all 10 digits. The time needed for processing is a function of the number of digits needed to represent a word or number.

As known in the art, fixed field length processing systems generally operate in parallel, resulting in faster operation, but the system usually requires a relatively large quantity of components. On the other hand, variable field length processing systems generally operate serially resulting in slower operation; however, the systems can operate with a relatively small number of components. Thus, this approach is desirable where small size, a small number of components, or flexibility in processing lengths is necessary.

In prior art variable field length processing systems, all digits needed to represent a number are usually included in the processing operation. When arithmetic operations are performed on two or more numbers, then the number of digits representing the resultant output tend to increase, resulting in an output number having more digits than either of the two input numbers. As the number of digits in a number increases, more time is needed for processing the number. Thus, the processing operation often slows down when large numbers appear, and speeds up with small numbers.

As known in the field of numerical analysis, when arithmetic operations are performed on numbers (operands), the precision of the resultant number can be determined by analyzing the precision of the operands and the type of arithmetic operation being performed; any digits that do not affect the accuracy of the resultant can be discarded. (Precision is defined as the degree of refinement with which an operation is performed or a measurement is stated. Precision can be contrasted with accuracy, the latter defined as the freedom from a mistake or error; in the measurement field, accuracy is the degree of conformity to some recognized standard value, or the deviation of a result obtained by a particular method from the value accepted as true. For example, the number 2.42 shows a higher precision than 2.4, but it is not necessarily any more accurate.)

In variable field length processing systems, in order to improve operational efficiency and processing speed, there is a need to incorporate the techniques of numerical analysis. The precision of the resultant answer should be determined, so that only digits within the proper degree of accuracy are carried, while any digits outside the degree of accuracy are eliminated.

OBJECTS AND SUMMARY OF THE INVENTION

Briefly, the invented variable field length arithmetic processing system comprises a processor for performing arithmetic operations on multidigit numbers having a predetermined degree of precision. The system produces a resultant output having a degree of precision determined by the degree of precision of each of the input numbers, and the type of arithmetic operation being performed. Any digits not within the degree of precision of the resultant output are eliminated. The present invention is independent of number base and representation, fixed or floating point format and right or left justification.

The invented system represents a significant improvement over prior art variable field length arithmetic processors because the former allows substantially fewer digits to be carried in the resultant output, and provides the same accuracy as the latter as well as a direct representation of the accuracy. Being able to operate with many less digits than prior art systems, the invented system eliminates the problem of unwanted digit accumulation that has burdened the prior art. Moreover, faster more efficient operation than heretofore possible now can be realized.

The novel features of the invention are set forth with particularity in the appended claims. The invention will best be understood from the following description when read in conjunction with the accompanying drawings.

BRIEF DESCRIPTION OF THE DRAWINGS

FIG. 1 is a simplified block diagram useful in introducing the application of the present invention;

FIG. 2 is a multiline diagram, which is useful in explaining the function and mode of operation of the present invention;

FIGS. 3 and 4 are block diagrams of one embodiment of the invention; and

DESCRIPTION OF THE PREFERRED EMBODIMENTS

Figure 3:
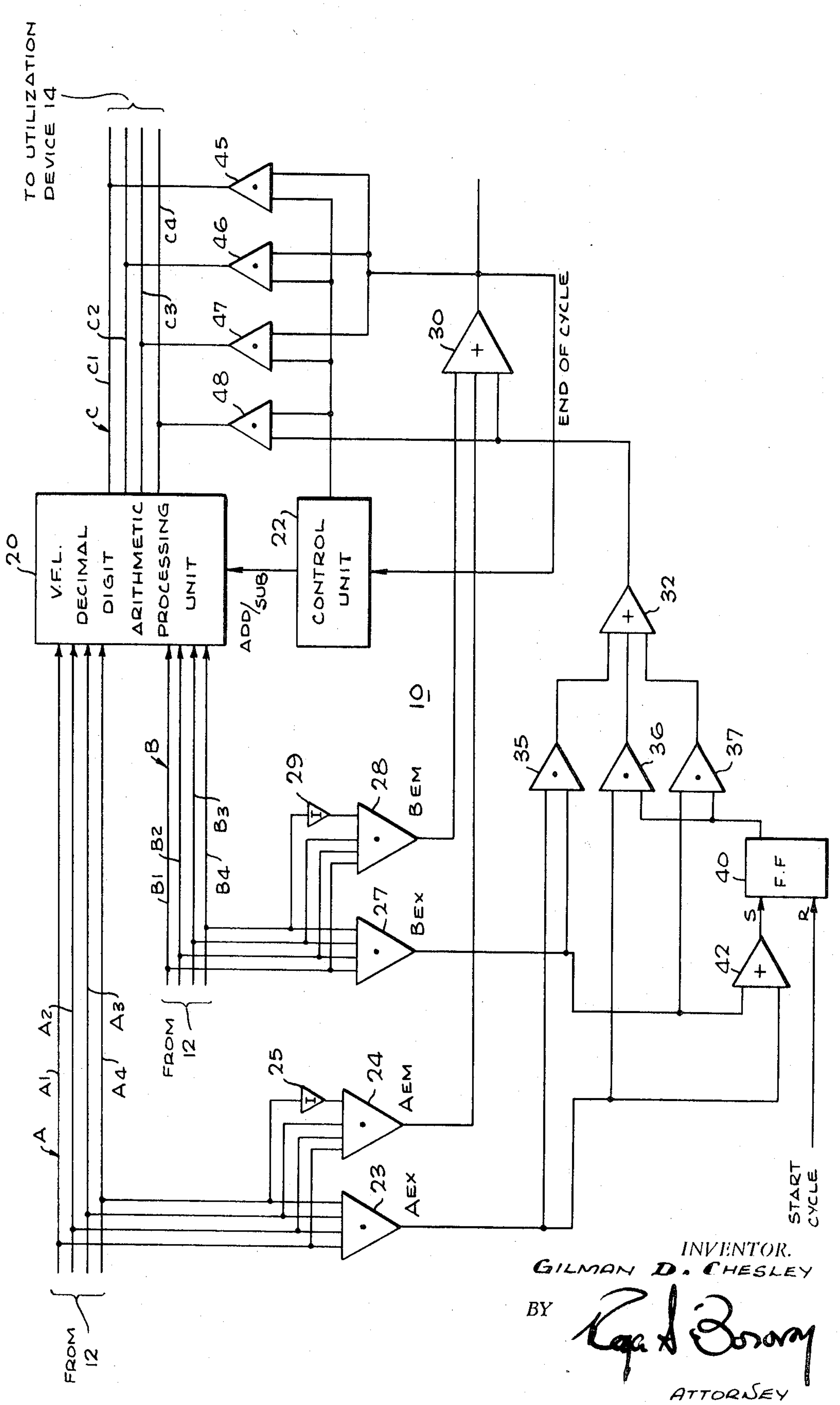

Reference is now made to FIG. 1 wherein reference numeral 10 designates a precision controlled variable field length arithmetic processor, shown connected, by means of multiline busses A and B, to a source of multidigit numbers 12. Each of the busses is assumed to consist of a plurality of conductors, for example, four lines, to provide means for transfering a multidigit number in binary coded decimal (BCD) between the two units to which it is connected. Source 12 may comprise a computer memory in which the numbers are stored or a pair of buffer registers, while a utilization device 14, to which the output number of processor 10 is supplied, may comprise an accumulator, or similar unit in a computer, to which the results of arithmetic operations on two numbers from source 12 are to be supplied.

Before proceeding to describe various embodiments of processor 10, reference is made to FIG. 2 in conjunction with which the principles of operations of the processor may best be explained. In each of the lines in FIG. 2, the block on the left-hand side and the center block represent the multidigit numbers from source 12, supplied on busses A and B respectively. The block on the right-hand side represents the resultant or output number supplied on a bus C to the utilization device. The type of arithmetic operation is indicated by one of the conventional signs, shown between the center and the left-hand blocks. Each of the numbers or operands, supplied to the processor, has associated therewith a precision-indicating flag. A flag EX indicates infinite (exact) precision, implying an infinite number of trailing zeros after the rightmost digit, while a flag EM designates finite (empirical) precision which is represented by the actual number of digits in the number (no trailing zeros are implied after the rightmost digit). The terms infinite and finite as used herein should be regarded as synonyms of exact (EX) and empirical (EM), respectively.

Briefly, arithmetic processing in processor 10 is controlled by the precision of the operands A and B. Processing continues until the number of digits of the result is equal to the number of digits of the result is equal to the number of digits of the least precise operand for multiply and divide (see lines *e* and $f$, or until the rightmost digit position, relative to the decimal point, which is precise in both operands is processed for add or subtract (see lines $b$, $c$ and $d$ ). If both operands are of infinite precision (lines $a$, $g$, and $h$) processing continues until there are not more explicit digits left for processing, assuming no machine limitations. Explicit digits are those digits actually supplied with a number, not counting implied zeros in the case of an exact number.

Each output C of the processor (right-hand column in FIG. 2) is provided with an associated precision-indicating flag. The flag indicates finite precision (EM) whenever at least one of the operands is of finite precision. The flag indicates infinite precision only if both operands are of infinite precision and providing processing is not terminated because of machine limitations but, rather, is terminated when there are no more explicit digits left for processing, as is the case in the two examples shown in lines $g$ and $h$ of FIG. 2.

Reference is now made to FIG. 3 which is a simplified block and schematic diagram of processor 10, designed for variable field length decimal processing proceeding from the high order digits to the low order digits, hereafter referred to as high-to-low order operation. It is assumed that one digit is processed at a time after decimal points are aligned and that each operand or number, supplied to the processor, is terminated with either an infinite precision EX flag or a finite precision EM FLAG. The arrangement shown in FIG. 3 includes the circuits or units necessary for the arithmetic operations of addition and subtraction (add/subtract).

As previously assumed, each digit is in BCD and therefore each bus, such as bus A, consists of four lines, designated A1, A2, A3 and A4. An infinite precision EX flag is assumed to be represented by the binary combination of 1111, while a finite precision EM flag is represented by 1110.

As shown in FIG. 3, the precision controlled variable field length (VFL) arithmetic processor 10 includes a VFL decimal digit arithmetic processing unit 20, controlled by a control unit 22. The four lines of each of busses A and B are connected to unit 20 so as to supply the operands A and B thereto. The output of unit 20, comprising the resultant or output of processor 10 is supplied to utilization device 14 by the four lines C1—C4 of bus C. Lines A1, A2 and A3 are directly connected to AND gates 23 and 24, while the fourth A4 line is directly connected to gate 23 and through an inverter 25 to gate 24.

Since an EX flag is represented by 1111, and an EM flag by 1110, it is apparent that AND gate 23 provides a true or high output upon sensing an EX flag in bus A while gate 24 provides a similar true or high output when an EM flag is sensed. The true or high outputs of gates 23 and 24 are designated by $A_{EX}$ and $A_{EM}$ respectively. A similar combination of gate 27, 28, and 29 is connected to the four lines of bus B. AND gate 27 provides a true output, designated $B_{EX}$, when an EX flag is sensed in bus B while a true $B_{EM}$ output of gate 28 represents the sensing of an EM flag in bus B.

The outputs of gates 24 and 28 are connected to inputs of an OR gate 30 whose third input is connected to the output of an OR gate 32. The inputs of the latter gate are connected to the outputs of three AND gates 35, 36, and 37. Gate 35 is connected to the outputs of AND gates 23 and 27, while each of AND gates 36 and 37 has one input connected to the output of a flip-flop 40. The output is true or high whenever the flip-flop is in a set (S) state. The other input of gate 36 is connected to gate 23 and the other input of AND gate 37 is connected to the output of gate 27. Gates 23 and 27 are connected to the inputs of an OR gate 42 whose output is connected to the set (S) input of flip-flop 40. The reset (R) input of flip-flop 40 is connected to receive a start cycle signal.

Briefly, one function of OR gate 30 is to provide a true or high output whenever the first finite precision EM flag is sensed. For the example diagrammed in line $b$ of FIG 2, during the fourth processing period, after the digit 6 of operand B has been supplied to unit 20 and processed therein, the finite precision EM flag, associated with operand B, is sensed by gate 28. The latter actuates the OR gate 30 to provide an end of processing cycle signal to control unit 22 to terminate the processing therein.

In addition, for the particular example, the output of gate 30 is used to actuate a plurality of gates which are in turn used to insert a finite precision EM flag in the output C of unit 20. Similarly, for the example diagrammed in line $c$ of FIG. 2, the finite precision EM flag, associated with operand A is sensed by gate 24, actuating OR gate 30 to terminate the processing in unit 20 as well as to insert the EM flag in the output. The insertion of the flag in the output will be described hereafter in detail.

OR gate 30 is also actuated, to provide a true output, whenever both input operands are associated with infinite precision EX flags, and the last of the two flags is sensed, in case the two do not appear simultaneously. Such a capability is provided by OR gate 32, AND gates 35, 36 and 37, flip-flop 40 and OR gate 42. If the two EX flags are sensed concurrently by gates 23 and 27, AND gate 35 provides a true output which in turn enables OR gate 32 whose output in turn enables OR gate 30. If, however, the first EX flag is sensed in bus A (see line $a$ FIG. 2) gate 23 is true enabling OR gate 42 which in turn sets flip-flop 40, which is driven to its reset state at the beginning of each processing cycle.

When flip-flop 40 is in a set state, it provides a true output to each of gates 36 and 37. Then, when the EX flat is sensed in bus B, gate 27 provides a true output to the other input of AND gate 37 which enables OR gate 32 in turn enabling OR gate 30 to provide an end of processing cycle signal to control unit 22. On the other hand, if the first EX flag is sensed in bus B, gate 27 causes flip-flop 40 to be set through OR gate 42 so that when the EX flag is sensed in bus A, gate 23 enables gate 36 which through gate 32 enables OR gate 30 to provide the end of processing cycle signal.

As seen in FIG. 3, the processor 10 further includes four AND gates 45, 46, 47 and 48 which are connected to lines C1, C2, C3 and C4 of output bus C. EAch of the gates is connected to control unit 22 to receive an enabling signal therefrom when the processor is operated to perform the arithmetic operation of addition or subtraction. The output of OR gate 30 is also supplied to each of gates 45, 46, and 47, while the output of OR gate 32 which is true or high only upon sensing the last of the two EX flags in case the two do not appear simultaneously is supplied to the other input of gate 48.

Briefly, when the end of processing cycle signal is produced by OR gate 30, gates 45, 46 and 47 are actuated to insert a 1 binary state in output lines C1, C2 and C3. If the end of processing cycle signal occurs due to the sensing of finite precision EM flag, gate 48 does not insert a 1 bit in output line C4. Thus, the binary combination inserted on the output bus is 1110, representing the finite precision EM flag. If on the other hand the end of cycle signal is produced, upon the sensing of the last of two EX flags, or when the two are simultaneously supplied to the processor and simultaneously sensed by gates 23 and 27, gate 48 is also enabled to insert a 1 binary state in output line C4. Thus, a binary combination of 1111 is inserted in the output bus to represent an infinite precision EX flag.

It should be pointed out that in high-to-low order arithmetic processing, it is necessary to temporarily store or hold the result digit until the question of a carry from the lower order digits is resolved. If a series of one or more nines is produced, these must be retained for subsequent output after the carry/no carry decision is made. This is generally accomplished by a special register and a counter, often referred to as a "-nines counter," which are assumed to be included in the processing unit 20. Such items, however, are not shown in detail since the present invention is not directed to the circuits or controls necessary for high-to-low order arithmetic processing, which are known in the art. Rather the invention is directed to circuitry necessary to control and limit such processing, so that the output precision, represented by the output's digit length and the precision flag associated therewith, are a function of the indicated precision of the processed operands.

From the foregoing it should thus be appreciated that the novel circuitry shown in FIG. 3 is operable to control the add/subtract processing in processor 10 so that if one of the operands is of finite precision, the digits of the output will be precise to the rightmost digit of such operand. Also, a finite precision EM flag is inserted in the output bus C to indicate the end of the output number (see lines *b*, *c* and *d* of FIG. 2). If both operands are of finite precision, the digits of the output will be precise to the rightmost digit precise in both operands. If, however, both operands are of infinite precision, the output length equals the length of the longer of the two operands. Only when both operands are of infinite precision is an infinite precision EX flag inserted in output bus C at the end of the output number.

The circuitry in FIG. 3 controls the processor's high-to-low order processing of addition and subtraction. The same circuitry, with minor changes, including additional circuitry, may be used to control multiplication and division operations, as well. From the foregoing explanation and from FIG. 2, it should be appreciated that in addition or subtraction the output digit precision never exceeds the precision of the shortest finite precision operand if both operands are of finite precision or the precision of the finite precision operand if the other operand is of infinite precision.

This is also the case when multiplication or division is performed. However, when both operands are of infinite precision and multiplication and division is performed, the output length may exceed the length of the largest operand since under such conditions processing continues until all explicit digits are processed, assuming no machine limitations. Two examples of such extended processing are diagrammed in lines *g* and *h* of FIG. 2. Consequently, in multiplication and division, it is necessary to determine the degree of precision of the two operands before processing starts.

If at least one of the operands is of finite precision, processing is controlled to produce an output of a digit length equal to the shortest least precise operand. If, however, both operands are of infinite precision, processing has to proceed until all explicit digits are processed. However, since in any data storage system the digit length of any storable number or word is finite, it is preferred to limit the processing so as not to exceed such machine-limited maximum digit length.

It is thus seen that in multiply and divide it is necessary to determine the roundoff point of the output as a function of the degrees of precision of the operands. To accomplish this end the precision controlled processor of the invention may be assumed to perform multiply or divide processing in a two-cycle operation, although the two cycles could be combined. In the first cycle the operands A and B are supplied for result roundoff point determination only. During this cycle a precision count is developed which is used during the second cycle to control the maximum number of digits which are processed by unit 20. Thus, the first cycle may be referred to as the scanning cycle and the second cycle may be thought of as the processing cycle.

The precision count may be accumulated in a counter which is designated by numeral 50 in FIG. 4, to which reference is made herein. An inverter 51 is connected between the output of OR gate 30 which, as herebefore explained, designates an end of processing cycle signal when true, and one input of an AND gate 52. The other input of gate 52 is assumed to receive clock pulses. The gate's output is connected to counter 50 wherein the count is incremented by one for each true output of gate 52. A line 54 connects the output of gate 32 to the counter to set it to a maximum, preselected count whenever the output of gate 32 is true. It should be recalled that this occurs only when both operands are of infinite precision and upon sensing the EX flag associated with the longer of the two.

When multiplication or division is to be performed, at the start of the first or scanning cycle the counter is reset, and the two operands are supplied, one digit of each, during each clock period until a cycle complete signal is provided by OR gate 30. During each clock period the clock pulse supplied to gate 52 increments the count by one (1). Thus, at the end of the first cycle the count represents the number of digits of the shortest finite precision operand if both are of finite precision, or the number of the digits of the least precise operand if they are of different degrees of precision. If, however, both operands are of infinite precision, in addition to the end of cycle signal from gate 30 which terminates the count incrementing, gate 32 provides a true output causing counter 50 to be set to a maximum preselected count. Generally, this maximum count equals the word bit length of the particular computer in which the processor is incorporated.

The count in counter 50 may be supplied to control unit 22 (FIG 3), via a line 55, for use during the second cycle of the processing operation in order to control the digit length of the output number from unit 20. If the count is of a finite value the output length equals the count in the counter (see lines *e* and *f* of FIG. 2). If, however, both operands are of infinite precision and the count in counter 50 is set, at the end of the first cycle, to a maximum preselected count, processing, during the second cycle, continues until there are no more explicit digits left for processing (see lines *g* and *h* of FIG. 2). However, processing is limited to the maximum count to limit the output digit length, so as not to exceed such count for machine limitation reasons.

The techniques of utilizing a count either of finite value or of a maximum value to control the number of steps of a process are well known by those familiar with computer processors and other numerical control systems. Furthermore, since the particular technique which may be employed does not form a part of the present invention, the actual gates and other control circuits needed to perform such controls are not shown in detail, and are assumed to be included in control unit 22.

The teachings of the invention may also be employed in a processor in which low-to-high order arithmetic processing takes place. In order to describe and diagram such a capability, let it be assumed that floating point integer mantissa operand storing techniques are employed, and that, the operands are right justified. It is further assumed that one digit is processed at a time, i.e., each clock period, and that each operand is terminated with an end code or flag at the left or high end.

As previously explained, each operand has associated therewith a precision-indicating flag. An EM flag designates finite precision which is represented by the operand's number of digits and an EX flag designates infinite precision. In the foregoing description, in conjunction with FIGS. 3 and 4, it was assumed that the precision-indicating flag is included in the operand's digit stream, appearing after the least significant digit. However, for the purposes of the following description, it is assumed that the end flag is in the operand's digit stream and that the precision-indicating flag is kept with the operand's exponent and sign fields of bits. The latter are not supplied on the input busses A and B (FIG. 3), but rather are used to control the supply of the operand's digits on these busses to the processing unit 20, as well as to control the output therefrom.

Figure 5:
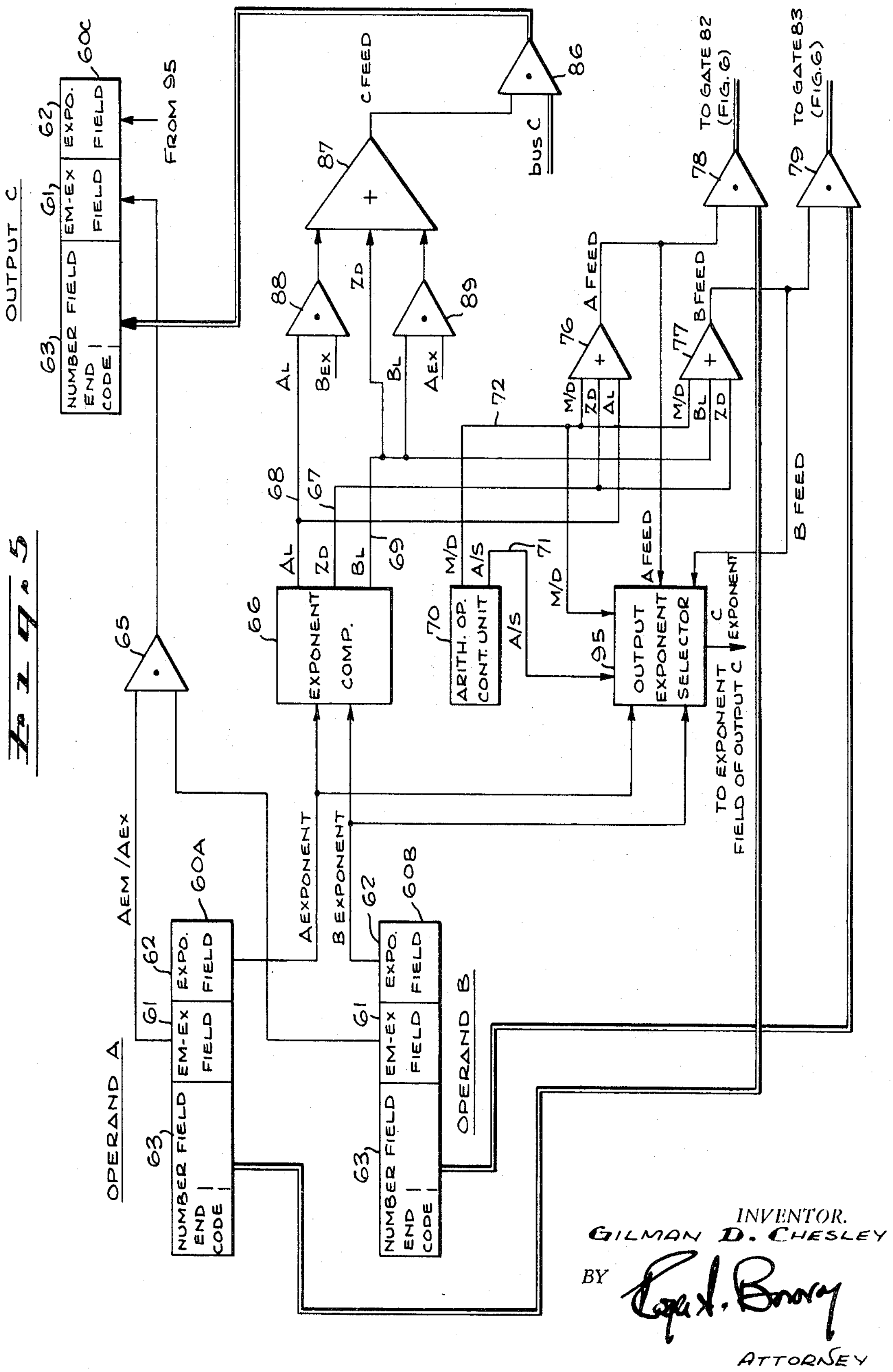
FIGS. 5 and 6 are block diagrams of a second embodiment of invention.
Figure 6:
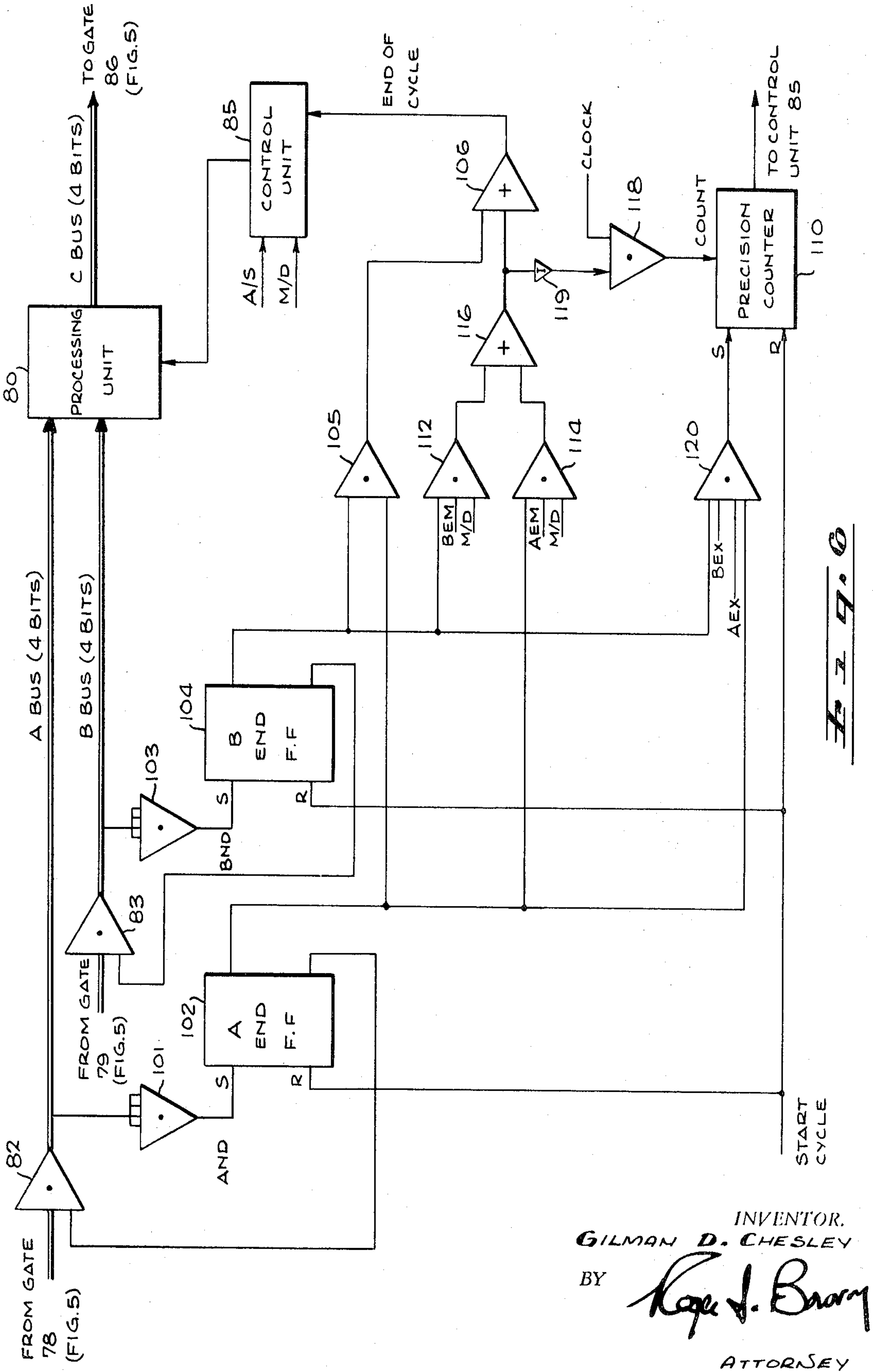

For a full understanding of the circuitry necessary to control the arithmetic processor which is incorporated in a system assumed to operate as herebefore outlined, reference is made to FIGS. 5 and 6. In FIG. 5, the word formats of operands A, B and output C are designated by 60A, 60B and 60C, respectively. Each word is assumed to include a precision indicator (EX-EM) field 61, an exponent field 62 and a variable length number field 63 which includes an end code. Since BCD processing is assumed, the end code is assumed to be represented by a four bit combination, for example, 1111. Although in practice, the content of a word, stored in memory, is read out or modified by connecting the word to appropriately energized read and/or write registers, such registers are purposely deleted from FIGS. 5 and 6, in order to simplify the diagrams so that only the novel features of the invention may be more clearly highlighted therein.

The precision of the output C, as defined by the EM-EX field 61 thereof, is controlled as a function of the precision fields 61 of the two operands. The outputs of the precision field 61 of the two operands are supplied to an AND gate 65 whose output is connected to precision field 61 of output C. For explanatory purposes, it is assumed that an infinite precision (EX) is represented by a true or high output form the precision field 61 while a finite precision (EM) is represented by a false or low output from the same field. Thus, it is appreciated that the output of AND gate 65 is true, thereby enabling the storing of an infinite precision EX flag in field 61 of output C only if the precision of each of the operands A and B is infinite. If, however, either of the operands is of finite precision, one of the inputs to AND gate 65 is low or false, and therefore, the output of AND gate 65 is low causing the storing of the finite precision EM flag in field 61 of the output C.

The control circuitry necessary for the practice of the teachings of the present invention, includes an exponent comparator 66 to which the contents of the exponent fields 62 of the two operands are supplied. If both exponents are equal a zero difference ($Z_D$) true output is provided on output line 67. If, however, the exponent of an operand A is smaller or less, a true $A_L$ output is provided on output line 68. Likewise, when the exponent of operand B is less, a true $B_L$ output is provided on line 69. An arithmetic operation control unit 70 provides a true A/S output when addition or subtraction operation is performed, while a true M/D output is provided on a line 72 when multiplication or division is performed.

The circuitry further includes a pair of OR gates 76 and 77 whose respective outputs are used to control the feeding of digits from the number field of operands A AND B respectively. The control is provided by the enabling of respective AND gates 78 and 79. It should be pointed out that each digit which is in BCD, is supplied from a number field as bits on four lines, and therefore, four AND gates such as 78 are required to control the feeding of digits of operand A. A similar separate group of four gates is required to control the feeding of the digits of operand B. Consequently each of gates 78 and 79 is assumed to represent four separate gates. It is for this reason that the input to each of gates 78 and 79 from the number field associated therewith is represented by two parallel lines. Similarly, its output is represented by dual lines.

Gate 76 provides a true output, enabling the feeding of a digit from operand A, whenever a true signal is present on any one of lines 72, 67 and 68, while the output of gate 77 is true whenever a true signal is present on any one of lines 72, 69 and 67. That is, in a multiply or divide operation, digit feeding is enabled from both operands. In an add or subtract (A/S) operation, digit feeding from both operands occurs only when the difference between their exponents is zero ($Z_D$). Digit feeding from the number field of any of the operands occurs only if its associated exponent is equal to or less than the exponent of the other operand.

Each digit, fed through gate 78, is supplied $Z_a$ processing unit 80 (FIG. 6) through an AND gate 82 which is assumed to represent one of four required gates, while each digit, fed through AND gate 79, is supplied through processing unit 80 through a control gate 83, which also represents one of four required gates. Processing unit 80 operates under the control of a control unit 85. The processed output is supplied on bus C to an AND gate 86 (see FIG. 5), which also represents one of four required gates. The feeding of the digits supplied to gate 86 from unit 80 through AND gate 86 is controlled by the output of an OR gate 87, whose output is also designated as $C_{FEED}$. Gate 87 is enabled to enable gate 86 to supply the processed digit to the number field of output C whenever the difference between the operand's exponents are zero ($Z_D$ is true). Also, gate 87 is enabled whenever the precision of operand B is infinite which is sensed by an AND gate 88, or whenever the exponent of operand B is smaller and the precision of operand A is infinite which is sensed by a similarly operating AND gate 89.

The exponent field 62 of output C is controlled by an output exponent selector 95 which is supplied with the exponents of the two operands, signals from arithmetic operation control unit 70 to indicate the particular arithmetic operation which is performed, and the signal outputs of OR gate 76 and 77. Briefly, in multiplication, the output of selector 95 represents the sum of the exponents of operands A and B, while when division operation is performed the output of selector 95 represents the difference of the two operands' exponents. In addition or subtraction, selector 95 sets the field 62 of the output C to equal the exponent of the first operand that is fed to processing unit 80 (FIG. 6) for processing. It is for the latter function that the $A_{FEED}$ and $B_{FEED}$ outputs of OR gates 76 and 77 respectively, are supplied to the selector 95. It should be appreciated by those familiar with the design of logic circuitry that various gating combinations may be employed in the implementation of selector 95 to perform the functions as hereinbefore outlined.

Referring to FIG. 6 addition or subtraction is performed, the processing cycle continues until the end codes of both operands are sensed. The end code of operand A is sensed by an AND gate 101 (FIG. 6) whose four inputs are connected to the four lines of bus A. The output of gate 101 is connected to the set (S) input of an A end flip-flop 102 which is reset at the start of the processing cycle. The set output of flip-flop 102 is connected to one input of an AND gate 105. This output is true or high only when the end code of the binary combination 1111 is sensed in bus A. The reset output of flip-flop 102 is connected to one input of AND gate 82 which prevents the feeding of digits from the A operand once the end code is sensed.

A similar combination of AND gates 83, 103 and a flip-flop 104 are used to inhibit the feeding of B operand digits and to provide a true output to the other input of AND gate 105 whenever the end code of operand B is sensed on bus B. Only when both flip-flops 102 and 104 are set are the two inputs of gate 105 true to provide an end of processing cycle signal to control unit 85. The latter, upon sensing the end of processing cycle signal, terminates the processing in processing unit 80.

On the other hand, when multiplication or division processing is performed, it is necessary to first determine the digit length of the shortest, least precise operand if both operands are of finite precision or the digit length of the operand of finite precision if one operand is of infinite precision. If both operands are of infinite precision then processing has to continue until all explicit digits are processed, without exceeding a maximum length represented by the machine limitation.

In the embodiment described in conjunction with FIGS. 5 and 6, this is accomplished by providing an arrangement similar to that shown in FIG. 4, which consists of a precision counter 110 which is used during the first of a two-cycle processing operation. At the start of the first or scanning cycle, the counter is reset to a zero count. An AND gate 112 is gate 120 provide a true output only when multiplication or division is performed, the precision of operand B is finite and the end code of operand B is sensed, which is represented by a true output from flip-flop 104. A similar AND gate 114 is utilized to provide a true output only when multiplication or division is performed and the precision of operand A is finite and the end code of operand A is sensed.

The output of each gates 112 and 114 is supplied to an OR gate 116 whose output is connected to OR gate 106 as well as to one input of an AND gate 118 through an inverter 119. The other input of gate 118 is assumed to receive the clock pulses of the processor. The output of gate 118 is connected to the count input terminal of counter 110.

It should be appreciated by those familiar with logic circuitry that the count, accumulated in 110, would correspond to the number of digits of the shortest finite precision operand, if both operands are of finite precision or, to the number of digits of an operand of finite precision if the other operand is of infinite precision. The control circuitry further includes an additional AND gate 120 which provides a true output to set the precision counter 110 to a maximum preselected count whenever both operands are of infinite precision and the end code of the longer of the two operands is sensed.

After the first of the two-cycle processing operations, during which a count is accumulated or determined in counter 110, the processing proceeds to the second cycle during which actual multiplication or division processing takes place. However, whereas in addition and subtraction control unit 85 controls processing unit 80 to proceed to process the digits supplied thereto until both end codes are sensed, in multiplication or division, it is the count in counter 110 which is supplied to control unit 85 which is used to determine the number of digits to be processed in unit 80.

The novel invention which has been described herebefore by the two exemplary embodiments may be summarized as comprising a control unit or means in a variable field length arithmetic processing system to which multidigit operands, such as A and B, are supplied for processing Each operand is assumed to be associated with a precision defining flag which is of a first value when the operand is of finite precision, or of a second value when the operand is of infinite precision. Infinite precision implies that the operands' last digit is followed by an infinite number of trailing zeros, while finite or empirical precision is indicated by the actual number of digits of the operand.

The control unit responds to the operands and the precision defining flags associated therewith, in order to control the otherwise conventional processor, when performing addition or subtraction, to continue processing until digits precise in both operands are processed when either operand is of finite precision. If, however, both operands are of infinite precision, processing proceeds until all digits of both operands are processed.

The control unit also includes means which are used to provide a count when multiplication or division is to be performed. The count represents the number of digits of the shorter of the two operands, when both are of finite precision, or the number of digits of the operand of finite precision if the other operand is of infinite precision. If, however, both operands are of infinite precision, the count is set to a preselected maximum value, typically, the bit length of a word of the computer system in which the processor is used.

Although particular embodiments of the invention have been described and illustrated herein, it is recognized that modifications and variations may readily occur to those skilled in the art and consequently it is intended that the claims be interpreted to cover such modifications and equivalents.

I claim:

1. Apparatus for performing arithmetic operations on multidigit numbers of a predetermined precision comprising:
- means for detecting the predetermined precision of each multidigit number;
- means for performing the arithmetic operations;
- means coupled to both said detecting means and said performing means for determining the number of digits within the degree of precision of the output of said performing means based on the predetermined precision of each of the input numbers to said detecting means and the kind of arithmetic operation being performed by said performing means; and
- means responsive to said determining means for eliminating the digits not within said degree of precision of the resultant output.

2. In a variable field length arithmetic processing system, including a processor, to which two multidigit operands are supplied for arithmetic processing, each operand being associated with a precision defining flag which is of a first value when the operand is of finite precision or a second value when the operand is of infinite precision, the improvement comprising control means, coupled to said processor and responsive to the operands and the precision defining flags associated therewith, for controlling said processor when performing addition or subtraction to process said operands until the rightmost digit of the shorter of the two operands is processed when the precision defining flags, associated with both operands, are of said first value, or until the rightmost digit of the operand of finite precision is processed if the other operand is of infinite precision, or until the rightmost digit of the longer of the two operands is processed if the two operands are both of infinite precision.

3. The arithmetic processing system as recited in claim 2 further including means responsive to the precision defining flags of said two operands for associating with the output of said processor, a precision defining flag which is of said first value when at least one of said operands is of finite precision or of said second value when both operands are of infinite precision.

4. The arithmetic processing system as recited in claim 2 further including logic means coupled to respond to at least said operands and a signal representing multiplication and division operations for providing a count which represents the number of digits of the shorter of the two operands when both operands are of finite precision, the count representing the number of digits of the operand which is of finite precision when the other operand is of infinite precision, or the count equaling a preselected value when both operands are of infinite precision.

5. The arithmetic processing system as recited in claim 4 further including means responsive to the precision defining flags of said two operands for associating, with the output of said processor, a precision defining flag which is of said first value when at least one of said operands is of finite precision or of said second value when both operands are of infinite precision.

6. The arithmetic processing system as recited in claim 5 further including means for providing an end of cycle signal as a function of the sensing of either end-of-operand flags associated with said operands, or said precision defining flags associated with said operands.

7. In an arithmetic processing system of the type having first and second input means for receiving first and second multidigit numbers respectively, and a processing unit supplied with said first and second numbers for performing a selected arithmetic operation thereon to provide a resultant output number in accordance therewith, the improvement comprising:
- first means coupled to said first and second input means for sensing the degree of precision of each of said first and second numbers; and
- control means coupled to said first means and to said processing unit for controlling the operation of said processing unit as a function of the degree of precision of said first and second numbers.

8. The system as recited in claim 7 wherein the digits of each of said first and second numbers are supplied in series high-to-low order whereby during each processing cycle the highest order digit of each number is first to be supplied and wherein the rightmost digit of each number is followed by a precision defining flag which is of a first value when the number is of finite precision and of a second value when said number is of infinite precision, and said first means include gating means for providing an end of processing cycle signal upon sensing a precision defining flag of said first value associated with either of said numbers or upon sensing a precision defining flag of said second value associated with one of said numbers after having previously sensed a similar flag associated with the other number, said control means including means for supplying said end of processing cycle signal to said processing unit to terminate the operation thereof, said control unit further including gating means for inserting a precision defining flag after the resultant output number from said processing unit, the value of the inserted precision defining flag being a function of the value of the precision defining flags of said first and second numbers.

9. The system as recited in claim 8 further including means for providing a count to said control unit representing the number of digits of the shortest of said numbers which is of finite precision and for providing a preselected maximum count when both of said numbers are of infinite precision.

10. The system as recited in claim 7 wherein each of said first and second numbers includes an end-of-number flag preceding the leftmost digit thereof and further including means providing either a finite precision defining signal or an infinite precision defining signal when the precision of said number is finite or infinite respectively, said system including means for providing a count indicative of the number of digits of the shorter of the two numbers which is of finite precision, or a preselected maximum count when both said first and second numbers are of infinite precision.

11. The system as recited in claim 10 further including first logic means within said first sensing means for sensing the end-of-number flag associated with each of said numbers to provide an end-of-cycle signal to said processing unit, upon sensing the end-of-number flags of both of said numbers, and second logic means within said control means for controlling the number of digits of the resultant output number as a function of the precisions of said numbers.

12. The system as recited in claim 11 wherein said second logic means include means which control said resultant output number so that the rightmost digit thereof corresponds to the rightmost digit of the shortest number when both said numbers are of finite precision, or to the rightmost digit of one of said numbers which is of finite precision if the other number is of infinite precision, or to the rightmost digit of the longer of the two numbers when both are of infinite precision, when said processing unit is operated in addition or subtraction, said second logic means further including means utilizing the count in said counting means for limiting the number of digits of the resultant output number to equal said count, when said processing unit is operable in multiplication and division.

13. In an arithmetic processing system of the type having first and second input means for receiving first and second multidigit numbers respectively, and a processing unit supplied with said first and second numbers for performing a selected arithmetic operation thereon and for providing a resultant output number in accordance therewith, the improvement comprising:

first means for sensing the degree of precision of each of said first and second numbers; and control means coupled to said first means and to said processing unit and responsive to a signal indicating addition or subtraction operation for limiting the processing until the rightmost digit is processed of the shorter of the two numbers when both numbers are of finite precision or until the rightmost digit of the least precise number is processed, when one number is of finite precision and the other number is of infinite precision, or until the rightmost digit is processed of the longer of the two numbers, when both numbers are of infinite precision.

14. The system as recited in claim 13 further including logic means for associating with said resultant output number a precision defining flag, said flag representing finite precision when at least one of said numbers is of finite precision, or said flag representing infinite precision when both of said numbers are of infinite precision.

15. The system as recited in claim 13 wherein said system further includes means responsive to a signal indicating multiplication or division operation and counting means for providing a count representing the number of digits of the shorter of the two numbers when both numbers are of finite precision, the count representing the number of digits of the least precise number if the numbers are of different degrees of precision, or the number equaling a preselected maximum value when both numbers are of infinite precision.

16. The system as recited in claim 15 further including logic means for associating with said resultant output number a precision defining flag, said flag being of a first value representing finite precision when at least one of said numbers is of finite precision, and said flag being of a second value representing infinite precision when both of said numbers are of infinite precision.